United States Patent [19]
Adachi

[11] Patent Number: 6,017,061
[45] Date of Patent: Jan. 25, 2000

[54] PRESSURE TRANSMITTING PASSAGE OF EVAPORATIVE FUEL TREATING APPARATUS

[75] Inventor: Tetsuya Adachi, Toyota, Japan

[73] Assignee: Toyota Jidosha Kabushiki Kaisha, Toyota, Japan

[21] Appl. No.: 08/953,409

[22] Filed: Oct. 17, 1997

[30] Foreign Application Priority Data

Oct. 30, 1996 [JP] Japan ..................... 8-288502

[51] Int. Cl.⁷ ..................... B60P 3/22
[52] U.S. Cl. ..................... 280/834; 137/588
[58] Field of Search ..................... 220/86.1, 86.2, 220/89.1, 745, 746, DIG. 27; 280/830, 834; 141/297, 290, 350; 138/26; 137/351, 587

[56] References Cited

U.S. PATENT DOCUMENTS

| | | | |
|---|---|---|---|
| 3,800,978 | 4/1974 | Sigwald | 220/85 R |
| 4,974,645 | 12/1990 | Johnson | 141/59 |
| 5,538,039 | 7/1996 | Harde | 137/592 |

FOREIGN PATENT DOCUMENTS

| | | |
|---|---|---|
| 7-502227 | 3/1995 | Japan . |
| 7-180627 | 7/1995 | Japan . |

*Primary Examiner*—Christopher P. Schwartz
*Assistant Examiner*—C. T. Bartz
*Attorney, Agent, or Firm*—Pillsbury Madison & Sutro LLP

[57] ABSTRACT

A pressure transmitting passage of an evaporative fuel treating apparatus, which allows communication between a differential pressure regulating valve provided at a fuel tank and a fueling port and includes hill portions and a dale portion, the hill portions and the dale portion being bent in a vertical direction of a vehicle, comprising: an enlarged diameter portion which is provided between the dale portion and the fueling port and can accommodate, at a position lower than a height of a liquid fuel column which can be pushed up due to internal pressure of the tank during fueling, fuel remaining in the dale portion.

20 Claims, 8 Drawing Sheets

PRESSURE TRANSMITTING PASSAGE OF EVAPORATIVE FUEL TREATING APPARATUS

BACKGROUND OF THE INVENTION

1. Field of the Invention

The present invention relates to a pressure transmitting passage of an evaporative fuel treating apparatus, and particularly to a pressure transmitting passage of an evaporative fuel treating apparatus which is provided in a fuel tank provided in a vehicle such as an automobile.

2. Description of the Related Art

There has conventionally been known a pressure transmitting passage of an evaporative fuel treating apparatus which is provided in a fuel tank provided in a vehicle such as an automobile. An example thereof is described in Japanese Patent Application Laid-Open (JP-A) No. 7-180627.

As shown in FIG. 8, applied to a vehicle is an onboard vapor recovery system (i.e., OVR system) in which, during fueling by using a fuel filling gun 70, evaporative fuel generated from a fuel tank 72 is sucked by a canister (not shown) connected to a vapor line 73. The fuel tank 72 is disposed below a floor panel 74. A fuel filling pipe 76, a vent pipe 78, and a pressure control line 80 serving as a pressure transmitting passage are each provided to extend from the fuel tank 72 to a fueling port 84 formed in a side wall portion 82 of the vehicle.

However, in the above-described structure, the pressure control line 80, whose one end portion is connected to a differential pressure regulating valve 88 disposed above the fuel tank 72, extends from the fuel tank 72 and below a side member 86 which is provided along a longitudinal direction of the vehicle at a lower surface side of the vicinity of a vehicle transverse direction outer end portion of the floor panel 74, such that the pressure control line 80 is connected to the oil feeding port 84 disposed at a position above the fuel tank 72. Hill portions 80A, 80B and a dale portion 80C are thus formed in the pressure control line 80.

Accordingly, in a state in which a liquid fuel 90 remains in the dale portion 80C of the pressure control line 80 due to fueling, traveling of the vehicle, condensation, or the like, because the amount of the liquid fuel being fed by the fuel filling gun 70 is greater than the amount of air flowing through the vent pipe 78, the internal pressure of the fuel tank 72 increases and the liquid fuel 90 remaining in the dale portion 80C of the pressure control line 80 is pushed up from the dale portion 80C to the portion 80B of the pressure control line 80 in the vicinity of the oil feeding port 84. When the pressure generated by the liquid fuel column of the liquid fuel 90 and the internal pressure of the fuel tank 72 become equal to each other, no difference in pressure between a low pressure chamber 88A and a high pressure chamber 88B of the differential pressure regulating valve 88 arises, and accordingly, the differential pressure regulating valve 88 does not open. For this reason, the internal pressure of the fuel tank 72 continues to rise, and subsequently, the filled liquid fuel flows backward within the fuel filling pipe 76, which causes a sensor of the fuel filling gun 70 to respond so as to stop the fueling operation before the fuel tank 72 is full.

Meanwhile, with regard to the present invention, there is disclosed a vent system of a fuel filling pipe in which a chamber is provided in a vent pipe of the fuel filling pipe so as to enlarge the vent passage (see Japanese Patent Application National Publication (Laid-Open) No. 7-502227).

SUMMARY OF THE INVENTION

In view of the aforementioned, it is an object of the present invention to provide a pressure transmitting passage of an evaporative fuel treating apparatus which can prevent stoppage of fueling prior to the fuel tank being full, which stoppage is caused by fuel remaining in a pressure control line.

A first aspect of the present invention is a pressure transmitting passage of an evaporative fuel treating apparatus, which allows communication between a differential pressure regulating valve provided at a fuel tank and a fueling port and includes hill portions and a dale portion, the hill portions and the dale portion being bent in a vertical direction of a vehicle, comprising: an enlarged diameter portion which is provided between the dale portion and the fueling port and can accommodate, at a position lower than a height of a liquid fuel column which can be pushed up due to internal pressure of the fuel tank during fueling, fuel remaining in the dale portion.

Accordingly, when the fueling port is opened, the fuel remaining in the dale portion of the pressure transmitting passage moves into the enlarged diameter portion due to the fuel tank internal pressure transmitted from an orifice of a differential pressure regulating valve, and the height of the liquid fuel column within the pressure transmitting passage is thereby reduced. As a result, the pressure generated by the liquid fuel column becomes low, and a sufficient difference in pressures occurs in chambers of the differential pressure regulating valve, thereby allowing opening of the differential pressure regulating valve. Further, an excellent effect is obtained in that stoppage of fueling prior to the full tank becoming full, which stoppage is caused by fuel remaining in the pressure control line, can be prevented.

A second aspect of the present invention is constructed such that, in the pressure transmitting passage of an evaporative fuel treating apparatus according to the above first aspect, the enlarged diameter portion includes, in an interior thereof, a projecting portion extending from the dale portion of the pressure transmitting passage, and a height of an end portion of the projecting portion from the bottom of the dale portion is set to be lower than a height of a liquid fuel column which can be pushed up due to internal pressure of the fuel tank at the time of beginning of fueling.

Accordingly, when the fueling port is opened, the fuel remaining in the dale portion of the pressure transmitting passage moves into the enlarged diameter portion due to the fuel tank internal pressure transmitted from an orifice of a differential pressure regulating valve, and the liquid fuel and the gas (including air) are separated from each other at the projecting portion of the pressure transmitting passage. As a result, the liquid fuel is contained at the bottom portion of the enlarged diameter portion, and the pressure transmitting passage is thereby ventilated. For this reason, the pressure within a low pressure chamber of the differential pressure regulating valve becomes atmospheric pressure and a sufficient difference in pressures occurs in the chambers of the differential pressure regulating valve, thereby allowing the differential pressure regulating valve to open promptly.

DESCRIPTION OF THE PREFERRED EMBODIMENTS

A first embodiment of a pressure transmitting passage of an evaporative fuel treating apparatus according to the present invention will be described hereinafter with reference to FIGS. 1 and 2.

It should be noted that arrows "UP" and "IN" shown in the accompanying drawings respectively point toward the top of the vehicle and the vehicle transverse direction inner side.

Figure 1:
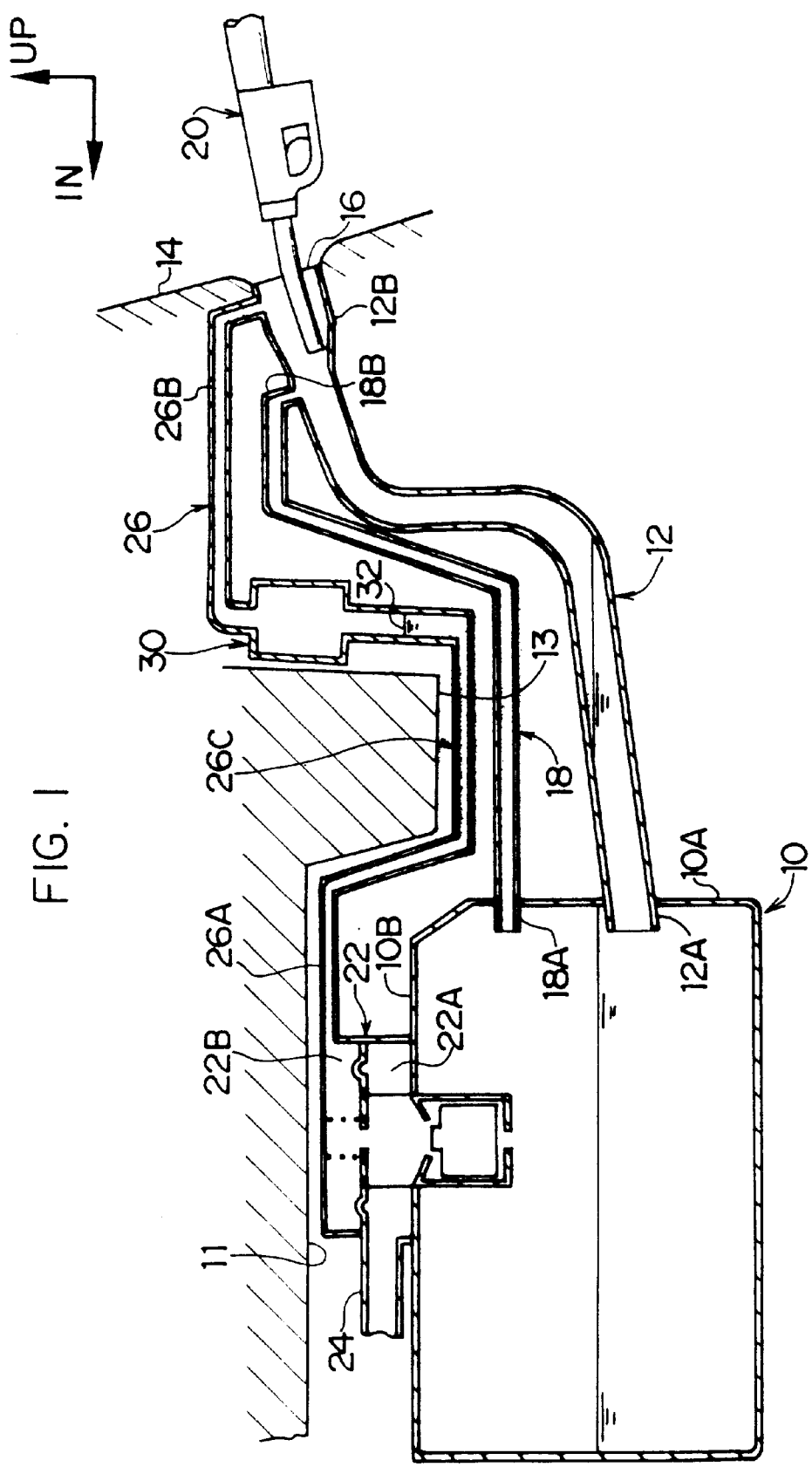
FIG. 1 is a schematic cross-sectional view showing a pressure transmitting passage of an evaporative fuel treating apparatus according to a first embodiment of the present invention.

As shown in FIG. 1, in the first embodiment, a fuel tank 10 is disposed below a floor panel 11. A side member 13 is disposed at a lower surface of the floor panel 11 in the vicinity of a vehicle transverse direction outer end portion of the floor panel 11 so as to extend along the longitudinal direction of the vehicle.

One end portion 12A of a fuel filling pipe 12 passes through a side wall portion 10A of the fuel tank 10 and is inserted in the fuel tank 10. Further, another end portion 12B of the fuel filling pipe 12 leads to a fueling port 16 provided in a vehicle side wall portion 14.

One end portion 18A of a vent pipe 18 passes through an upper portion of the side wall portion 10A of the fuel tank 10 and is inserted in the fuel tank 10. Another end portion 18B of the vent pipe 18 is connected to a portion of the fuel filling pipe 12 in the vicinity of the end portion 12B.

A fueling gun 20 can be inserted in the fueling port 16. When, at the time of fueling, the liquid surface of the fuel within the fuel filling pipe 12 rises and the liquid surface of the fuel is detected by a sensor provided at the fueling gun 20, fueling by the fueling gun 20 is automatically stopped.

A known differential pressure regulating valve 22 is disposed on an upper wall portion 10B of the fuel tank 10.

A vapor line 24 leading to a canister (not shown) is connected to a high pressure chamber 22A of the differential pressure regulating valve 22, and a so-called onboard vapor recovery system is thereby formed. Further, one end portion 26A of a pressure control line 26 serving as a pressure transmitting passage of an evaporative fuel treating apparatus is connected to a low pressure chamber 22B of the differential pressure regulating valve 22. Another end portion 26B of the pressure control line 26 communicates with the fueling port 16.

The fuel filling pipe 12, the vent pipe 18, and the pressure control line 26 each extend from the fuel tank 10 to the fueling port 16 along the lower side of the side member 13. The pressure control line 26 is formed to have hill portions and a dale portion to prevent interference with the side member 13. Namely, portions of the pressure control line 26 in the vicinities of the end portions 26A, 26B are each formed as a hill portion, and a portion of the pressure control line 26 which is bent in a U-shaped configuration along the side member 13 is formed as a dale portion 26C. Further, an enlarged diameter portion 30 is formed in the pressure control line 26 between the dale portion 26C and the hill portion disposed in the vicinity of the end portion 26B.

Figure 2:
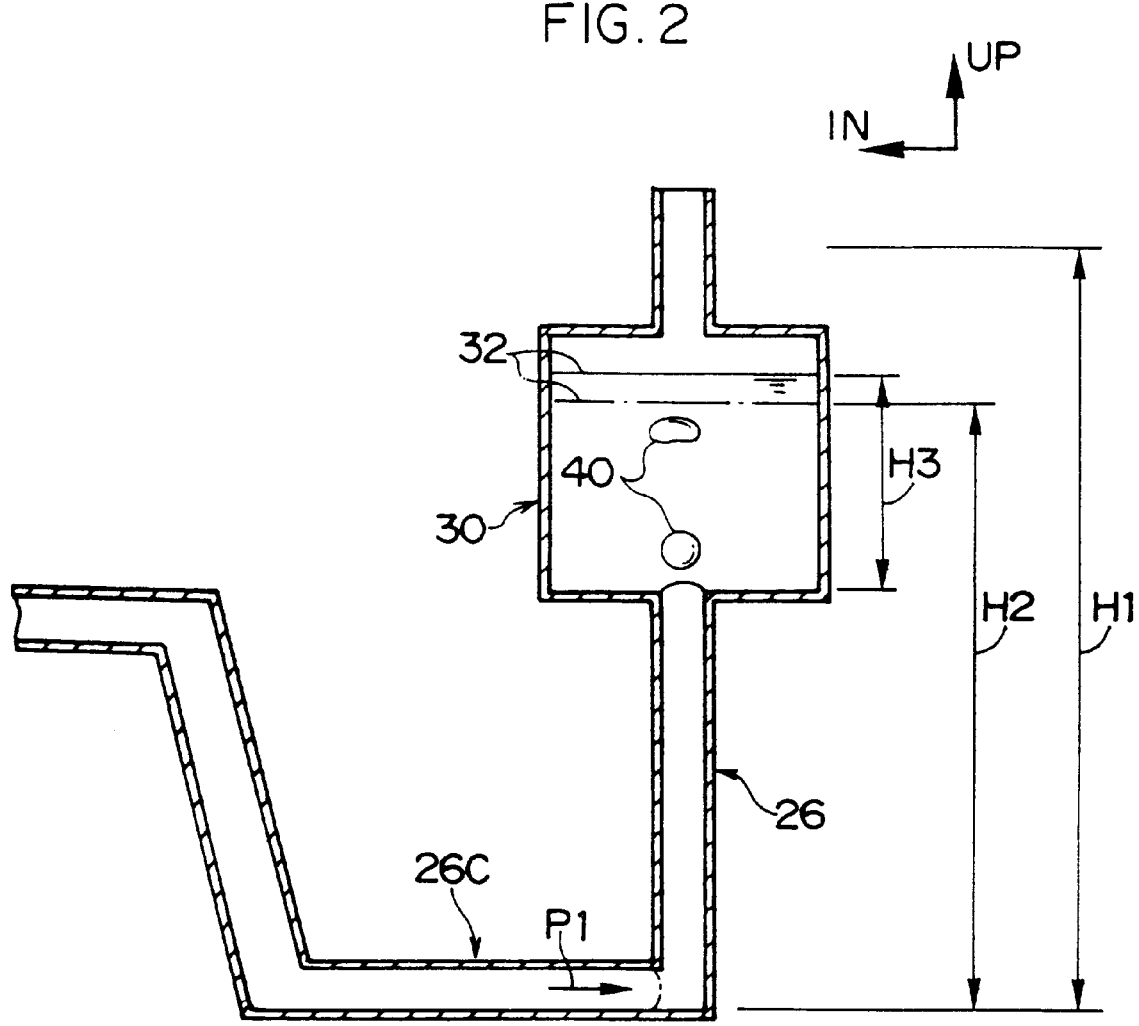
FIG. 2 is an enlarged cross-sectional view showing an enlarged diameter portion, and the periphery thereof, of the pressure transmitting passage of an evaporative fuel treating apparatus according to the first embodiment of the present invention.

As shown in FIG. 2, the enlarged diameter portion 30 of the pressure control line 26 has a volume such that a liquid fuel 32 remaining in the dale portion 26C can be accommodated at a position lower than a height H1 of a liquid fuel column which would be pushed upward by the maximum internal pressure of the tank (see arrow P1 in FIG. 2) during fueling if no enlarged diameter portion 30 were formed.

Next, operation of the first embodiment will be described.

In the first embodiment, fueling of the fuel tank 10 is effected by the fueling gun 20 being inserted from the fueling port 16 into the end portion 12B of the fuel filling pipe 12.

At this time, when a fueling cap is removed to open the fueling port 16, the liquid fuel 32 remaining in the dale portion 26C of the pressure control line 26 is pushed to an end portion of the dale portion 26C due to the internal pressure (indicated by arrow P1 in FIG. 2) of the fuel tank 10 transmitted from an orifice of the differential pressure regulating valve 22, and some of the liquid fuel 32 moves into the enlarged diameter portion 30 (see the state indicated by the one-dot chain line in FIG. 2). For this reason, height H2 of the liquid column of the liquid fuel 32 becomes lower than height H1. Accordingly, the pressure of the liquid column of the liquid fuel having height H2 is smaller than that of the liquid column of the liquid fuel having height H1.

In addition, when the liquid fuel 32 is further pushed and all of the liquid fuel 32 moves into the interior of the enlarged diameter portion 30 (see the state indicated by the solid line in FIG. 2), gas within the pressure control line 26 is let out upwardly from the enlarged diameter portion 30 in the form of air bubbles 40.

Accordingly, the pressure in the low pressure chamber 22B of the differential pressure regulating valve 22 shown in FIG. 1 varies in a range around the pressure generated by height H3 of the liquid fuel 32 within the enlarged diameter portion 30. Further, the internal pressure in the high pressure chamber 22A of the differential pressure regulating valve 22 continues to rise due to fueling pressure, as does the internal pressure of the fuel tank 10. As a result, the pressure difference between the high pressure chamber 22A and the low pressure chamber 22B of the differential pressure regulating valve 22 (i.e., the difference between the internal pressure of the fuel tank 10 and the pressure generated by height H3 of the liquid fuel 32 within the enlarged diameter portion 30) becomes large, and the differential pressure regulating valve 22 thereby opens. Then, gas passes through the pressure control line 26 and is let out of the enlarged diameter portion 30 into the end portion 26B as air bubbles 40. For this reason, it is possible to prevent liquid fuel from flowing backward due to the pressure of the liquid column of the fuel remaining in the dale portion 26C of the pressure control line 26, and thus prevent stoppage of fueling prior to the fuel tank 10 becoming full.

Both of height H2 and height H3 of the liquid fuel 32 when the liquid fuel 32 is contained in the enlarged diameter portion 30 can be freely adjusted by changing the diameter of the enlarged diameter portion 30, and therefore, these heights can be set in accordance with the pressure which opens the differential pressure regulating valve 22.

Next, a second embodiment of the pressure transmitting passage of an evaporative fuel treating apparatus according to the present invention will be will be described with reference to FIG. 3.

It should be noted that the same members as those of the first embodiment will be denoted by the same reference numerals, and description thereof will be omitted.

Figure 3:
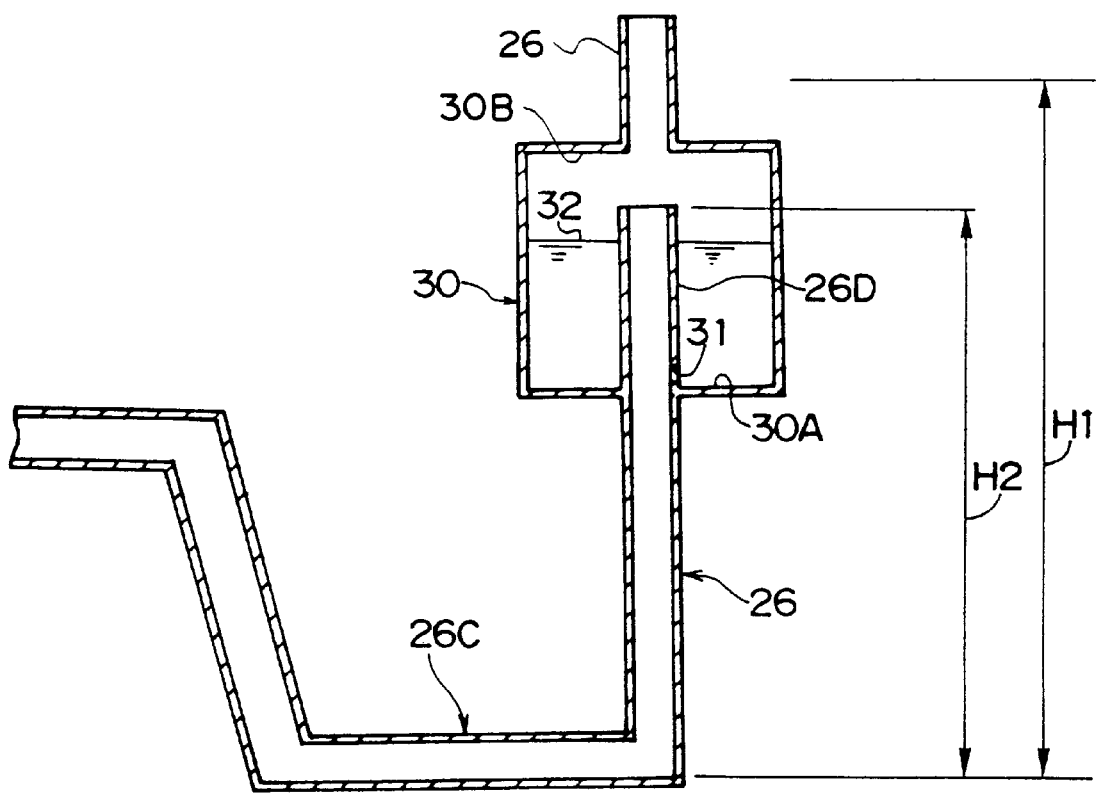
FIG. 3 is an enlarged cross-sectional view showing an enlarged diameter portion, and the periphery thereof, of a pressure transmitting passage of an evaporative fuel treating apparatus according to a second embodiment of the present invention.

As shown in FIG. 3, in the second embodiment, a projecting portion 26D extends from the dale portion 26C side of the control line 26 so as to project from the bottom 30A of the enlarged diameter portion 30. Height H2 of the projecting portion 26D is set to be lower than height H1 of the liquid fuel column which can be pushed upward due to the maximum internal pressure of the fuel tank 10 during fueling. Further, a drain hole 31 is formed at a base portion of the projecting portion 26D so that, upon completion of fueling, the liquid fuel 32 staying at the bottom 30A of the enlarged diameter portion 30 is allowed to gradually return to the dale portion 26C of the pressure control line 26. Further, the axis of the projecting portion 26D is provided to substantially coincide with that of the portion of the pressure control line 26, which portion communicates with the fueling port 16 and is formed at a ceiling portion 30B of the enlarged diameter portion 30.

Accordingly, in the second embodiment, when the liquid fuel is pushed out from the projecting portion 26D of the pressure control line 26 during fueling, the liquid fuel and gas (including air) are separated from each other. Further, the liquid fuel remains at the bottom 30A of the enlarged diameter portion 30. As a result, ventilation of the pressure control line 26 is allowed so that the pressure of the low pressure chamber 22B of the differential pressure regulating valve 22 becomes atmospheric pressure. For this reason, the difference in pressure between the low pressure chamber 22B and the high pressure chamber 22A of the differential pressure regulating valve 22 becomes great, and the differential pressure regulating valve 22 thereby opens. This makes it possible to prevent stoppage of fueling prior to the fuel tank 10 becoming full, which stoppage is caused by the fuel remaining in the dale portion 26C of the pressure control line 26.

When the height of the projecting portion 26D is low and a large quantity of liquid fuel is contained in the enlarged diameter portion 30, the top portion of the projecting portion 26D may be positioned lower than the liquid surface of the liquid fuel. However, gas within the pressure control line 26 is let out upwardly from the enlarged diameter portion 30 as air bubbles in the same way as in the first embodiment, and therefore, the same effects as those of the first embodiment can be obtained. For this reason, the height of the projecting portion 26D is not particularly limited.

Next, a third embodiment of the pressure transmitting passage of an evaporative fuel treating apparatus according to the present invention will be described with reference to FIG. 4.

It should be noted that the same members as those of the second embodiment will be denoted by the same reference numerals, and description thereof will be omitted.

Figure 4:
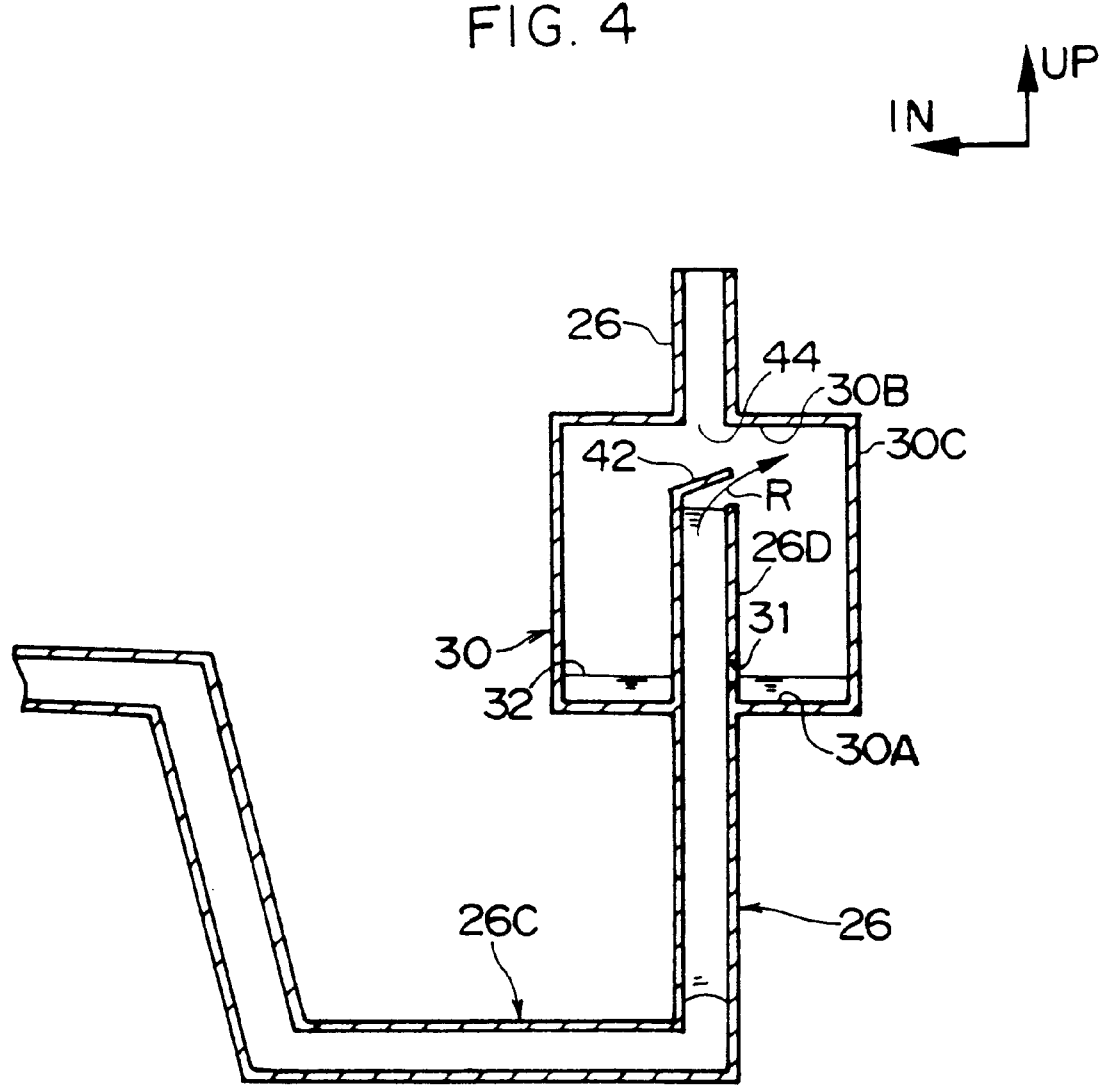
FIG. 4 is an enlarged cross-sectional view showing an enlarged diameter portion, and the periphery thereof, of a pressure transmitting passage of an evaporative fuel treating apparatus according to a third embodiment of the present invention.

As shown in FIG. 4, in the third embodiment, an inclined plate 42 is mounted at an end of the projecting portion 26D of the pressure control line 26. The liquid fuel (indicated by arrow R in FIG. 4), which is emitted from the end of the projecting portion 26D of the pressure control line 26 toward a communicating port 44 formed in the ceiling portion 30B of the enlarged diameter portion 30 and connected to the pressure control line 26, abuts against the inclined plate 42 so as to flow toward a side wall portion 30C of the enlarged diameter portion 30.

Accordingly, in the third embodiment, in addition to the operation of the second embodiment, during fueling, even when the liquid fuel is emitted strongly from the end of the projecting portion 26D of the pressure control line 26 toward the communicating port 44 for communication with the pressure control line 26, the liquid fuel abuts against the inclined plate 42 to flow toward the side wall portion 30C of the enlarged diameter portion 30. For this reason, the liquid fuel emitted strongly from the end of the projecting portion 26D of the pressure control line 26 can be prevented from entering into the pressure control line 26 from the communicating port 44.

Next, a fourth embodiment of the pressure transmitting passage of an evaporative fuel treating apparatus according to the present invention will be described with reference to FIG. 5.

It should be noted that the same members as those of the second embodiment will be denoted by the same reference numerals, and description thereof will be omitted.

Figure 5:
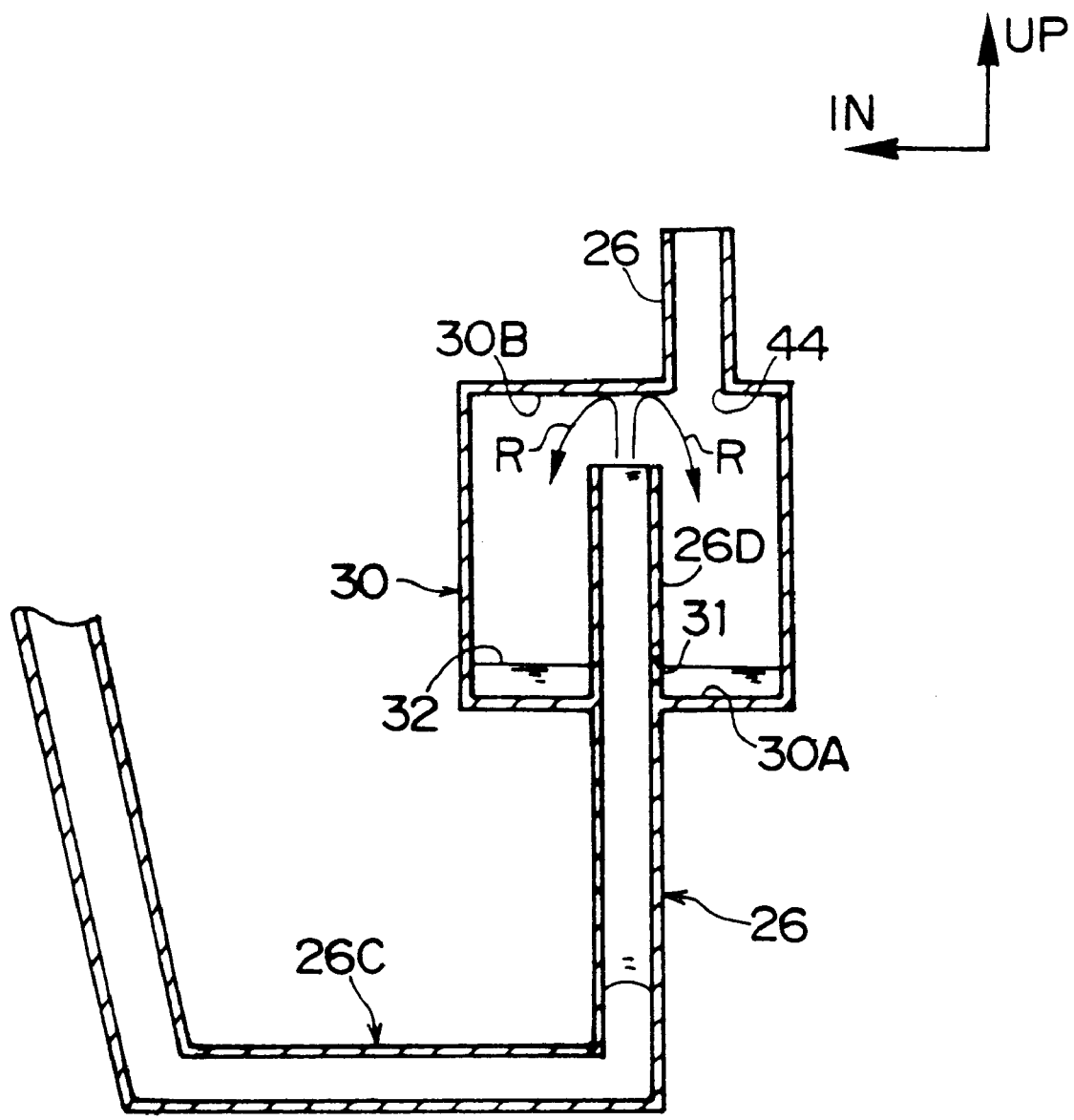
FIG. 5 is an enlarged cross-sectional view showing an enlarged diameter portion, and the periphery thereof, of a pressure transmitting passage of an evaporative fuel treating apparatus according to a fourth embodiment of the present invention.

As shown in FIG. 5, in the fourth embodiment, the projecting portion 26D of the pressure control line 26 and the communicating port 44, which is formed in the ceiling portion 30B of the enlarged diameter portion 30 and communicates with the pressure control line 26 communicating with the fueling port 16, are disposed so as to be completely offset from each other and not oppose one another. (Namely, the axis of the projecting portion 26D and the axis of the pressure control line 26 are provided so as to be offset from each other.)

Accordingly, in the fourth embodiment, in addition to the operation of the second embodiment, even when the liquid fuel is emitted strongly from the end of the projecting portion 26D of the pressure control line 26 during fueling, the liquid fuel abuts against the ceiling portion 30B of the enlarged diameter portion 30. For this reason, the liquid fuel emitted strongly from the end of the projection portion 26D of the pressure control line 26 can be prevented from entering into the pressure control line 26 from the communicating port 44.

Figure 6:
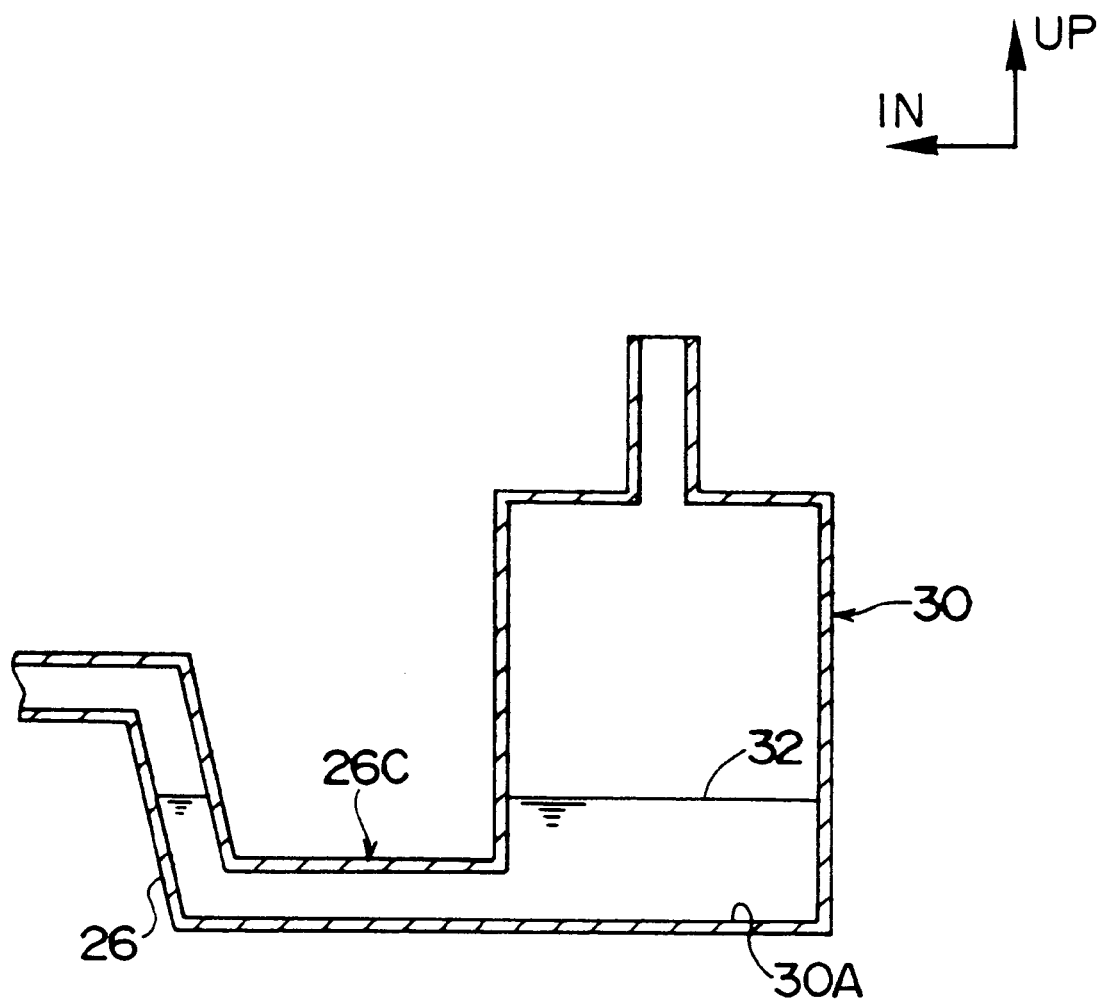
FIG. 6 is an enlarged cross-sectional view showing an enlarged diameter portion, and the periphery thereof, of a pressure transmitting passage of an evaporative fuel treating apparatus according to another embodiment of the present invention.
Figure 7:
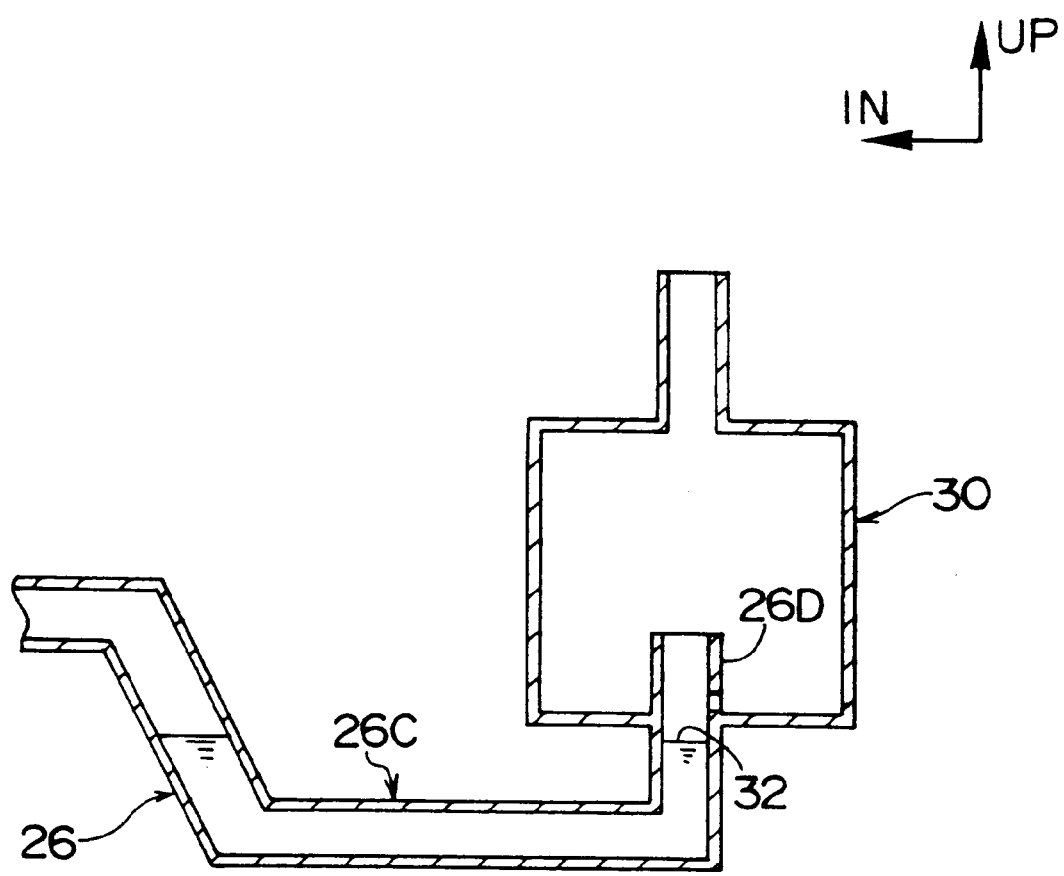
FIG. 7 is an enlarged cross-sectional view showing an enlarged diameter portion, and the periphery thereof, of a pressure transmitting passage of an evaporative fuel treating apparatus according to still another embodiment of the present invention.
Figure 8:
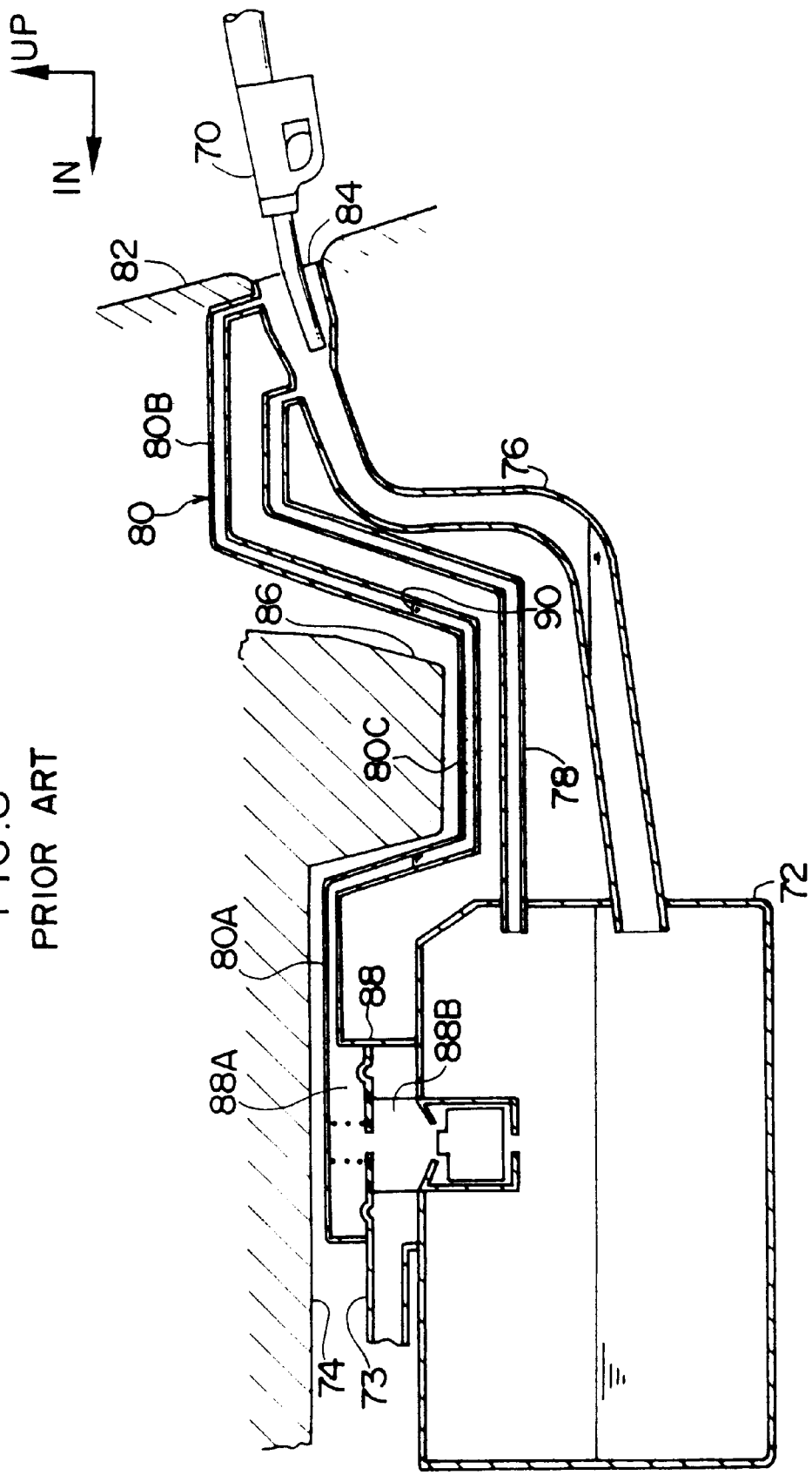
FIG. 8 is a schematic cross-sectional view showing a pressure transmitting passage of an evaporative fuel treating apparatus according to a conventional example.

In the foregoing, although the present invention has been described by specific embodiments in detail, the present invention is not limited to the same, and it is to be understood by those skilled in the art that various changes and modifications may be made without departing from the spirit and scope of the invention. For example, in each of the above-described embodiments, the enlarged diameter portion 30 is disposed at an upper position separated from the bottom of the dale portion 26C of the pressure control line 26. However, as shown in FIG. 6, the bottom 30A of the enlarged diameter portion 30 may be set at the same height as the bottom of the dale portion 26C. Further, as shown in FIG. 7, the bottom 30A of the enlarged diameter portion 30 may be set at a low position near the bottom of the dale portion 26C. In these cases, when a small quantity of liquid fuel remains in the dale portion 26C, the liquid fuel promptly moves to the enlarged diameter portion 30 during fueling, and a difference in pressure occurs in the differential pressure regulating valve. For this reason, the differential pressure regulating valve can be opened even more promptly.

What is claimed is:

1. A pressure transmitting passage of an evaporative fuel treating apparatus, which allows communication between a differential pressure regulating valve provided at a fuel tank and a fueling port and includes hill portions and a dale portion, the hill portions and the dale portion being bent in a vertical direction of a vehicle, comprising:

an enlarged diameter portion which is provided between the dale portion and the fueling port and can accommodate, at a position lower than a height of a liquid fuel column which can be pushed up due to internal pressure of the fuel tank during fueling, fuel remaining in the dale portion; and a projecting portion in an interior of the enlarged diameter portion, extending from the dale portion of the pressure transmitting passage, which includes, at a top, portion thereof, a fuel entry preventing member which prevents fuel from entering into the pressure transmitting passage which communicates with the fueling port.

2. A pressure transmitting passage of an evaporative fuel treating apparatus according to claim 1, wherein a height of an end portion of the projecting portion from the bottom of the dale portion is set to be lower than a height of a liquid fuel column which can be pushed up due to internal pressure of the fuel tank at the time of beginning of fueling.

3. A pressure transmitting passage of an evaporative fuel treating apparatus according to claim 2, wherein said projecting portion is formed to be substantially coaxial with the pressure transmitting passage which communicates with the fueling port.

4. A pressure transmitting passage of an evaporative fuel treating apparatus according to claim 2, wherein said projecting portion is formed such that an axis thereof is offset from an axis of the pressure transmitting passage which communicates with the fueling port.

5. A pressure transmitting passage of an evaporative fuel treating apparatus according to claim 2, wherein said projecting portion includes a drain hole, said drain hole being provided to return fuel remaining in the enlarged diameter portion to the dale portion upon completion of fueling.

6. A pressure transmitting passage of an evaporative fuel treating apparatus according to claim 1, wherein said enlarged diameter portion includes a bottom portion which is set at the same height as that of the dale portion.

7. A pressure transmitting passage of an evaporative fuel treating apparatus according to claim 6, wherein a height of an end portion of the projecting portion from the bottom of the dale portion is set to be lower than a height of a liquid fuel column which can be pushed up due to internal pressure of the fuel tank at the time of beginning of fueling.

8. A pressure transmitting passage of an evaporative fuel treating apparatus according to claim 7, wherein said projecting portion is formed to be substantially coaxial with the pressure transmitting passage which communicates with the fueling port.

9. A pressure transmitting passage of an evaporative fuel treating apparatus according to claim 7, wherein said projecting portion is formed such that an axis thereof is offset from an axis of the pressure transmitting passage which communicates with the fueling port.

10. A pressure transmitting passage of an evaporative fuel treating apparatus according to claim 7, wherein said projecting portion includes a drain hole, said drain hole being provided to return fuel remaining in the enlarged diameter portion to the dale portion upon completion of fueling.

11. A pressure transmitting passage of an evaporative fuel treating apparatus, which allows communication between a differential pressure regulating valve provided at a fuel tank and a fueling port and includes hill portions and a dale portion, the hill portions and the dale portion being bent in a vertical direction of a vehicle, comprising:

an enlarged diameter portion which is provided between the dale portion and the fueling port and can accommodate, at a position lower than a height of a liquid fuel column which can be pushed up due to internal pressure of the fuel tank during fueling, fuel remaining in the dale portion; and a projecting portion in an interior of the enlarged diameter portion, extending from the dale portion of the pressure transmitting passage, which includes a drain hole, said drain hole being provided to return fuel remaining in the enlarged diameter portion to the dale portion upon completion of fueling.

12. A pressure transmitting passage of an evaporative fuel treating apparatus according to claim 11, wherein a height of an end portion of the projecting portion from the bottom of the dale portion is set to be lower than a height of a liquid fuel column which can be pushed up due to internal pressure of the fuel tank at the time of beginning of fueling.

13. A pressure transmitting passage of an evaporative fuel treating apparatus according to claim 12, wherein said projecting portion is formed to be substantially coaxial with the pressure transmitting passage which communicates with the fueling port.

14. A pressure transmitting passage of an evaporative fuel treating apparatus according to claim 12, wherein said projecting portion is formed such that an axis thereof is offset from an axis of the pressure transmitting passage which communicates with the fueling port.

15. A pressure transmitting passage of an evaporative fuel treating apparatus according to claim 13, wherein said projecting portion includes, at a top portion thereof, a fuel entry preventing member which prevents fuel from entering into the pressure transmitting passage which communicates with the fueling port.

16. A pressure transmitting passage of an evaporative fuel treating apparatus according to claim 11, wherein said enlarged diameter portion includes a bottom portion which is set at the same height as that of the dale portion.

17. A pressure transmitting passage of an evaporative fuel treating apparatus according to claim 16, wherein a height of an end portion of the projecting portion from the bottom of the dale portion is set to be lower than a height of a liquid fuel column which can be pushed up due to internal pressure of the fuel tank at the time of beginning of fueling.

18. A pressure transmitting passage of an evaporative fuel treating apparatus according to claim 17, wherein said projecting portion is formed to be substantially coaxial with the pressure transmitting passage which communicates with the fueling port.

19. A pressure transmitting passage of an evaporative fuel treating apparatus according to claim 17, wherein said projecting portion is formed such that an axis thereof is offset from an axis of the pressure transmitting passage which communicates with the fueling port.

20. A pressure transmitting passage of an evaporative fuel treating apparatus according to claim 18, wherein said projecting portion includes, at a top portion thereof, a fuel entry preventing member which prevents fuel from entering into the pressure transmitting passage which communicates with the fueling port.

* * * * *